G. SICKEL.
COTTON PICKER.
APPLICATION FILED JUNE 3, 1909.
944,156.
Patented Dec. 21, 1909.
2 SHEETS—SHEET 2.
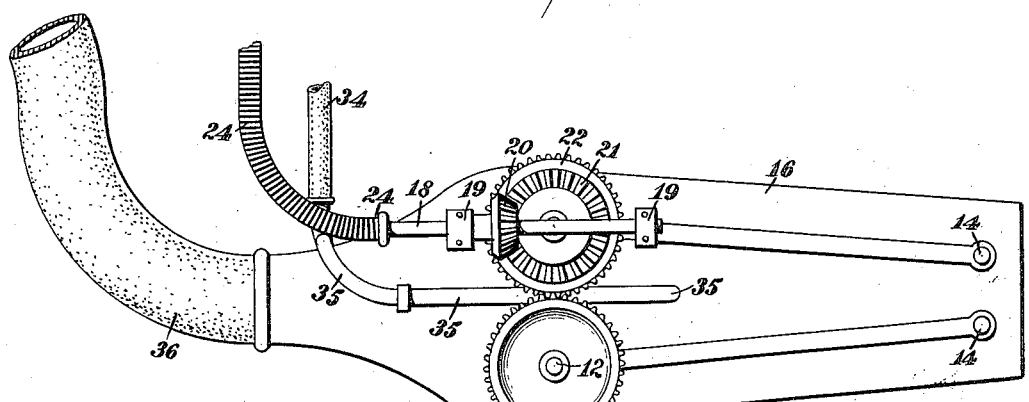
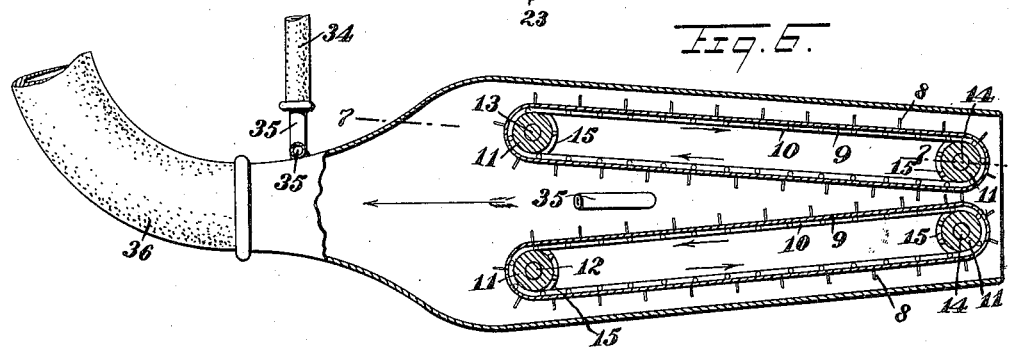
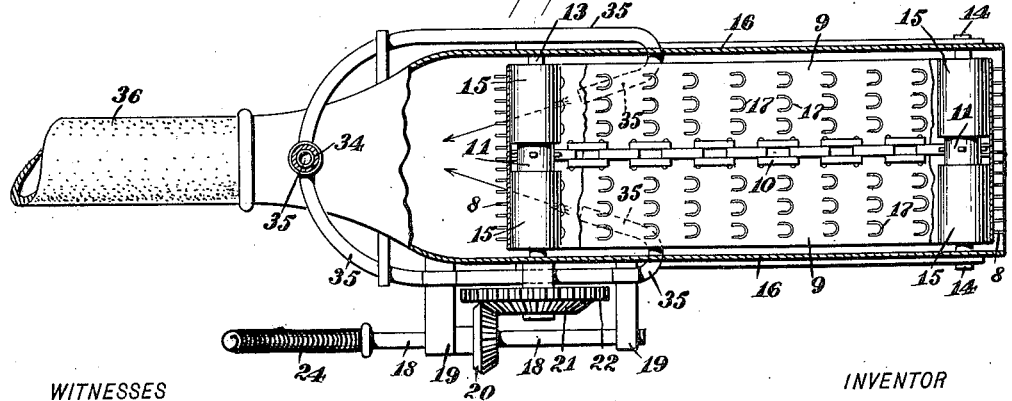
WITNESSES
H. J. Walker
J. P. Davis
INVENTOR
George Sickel
BY Munn & Co
ATTORNEYS

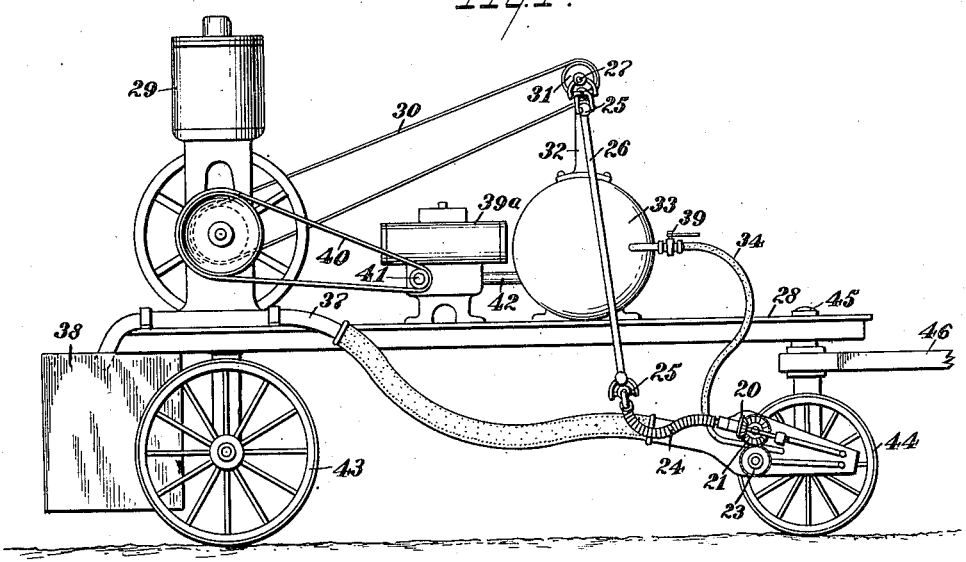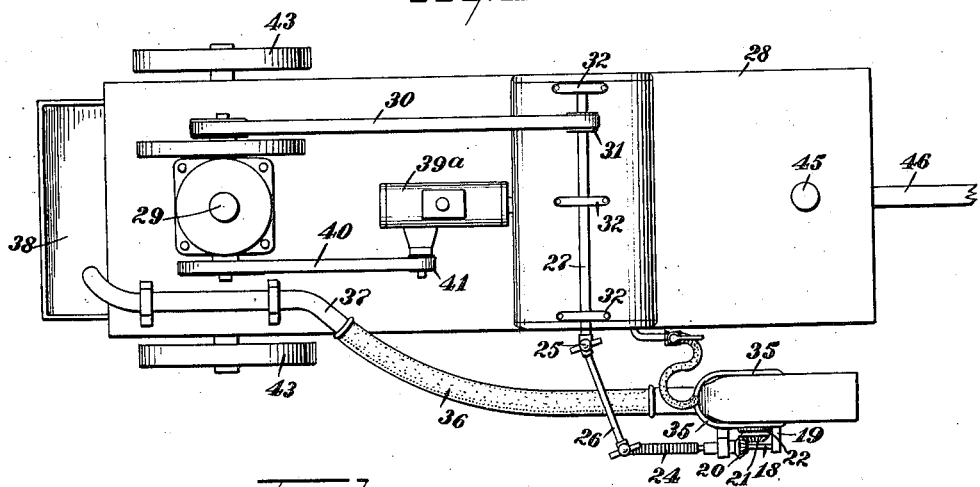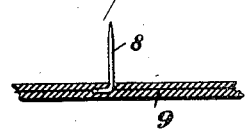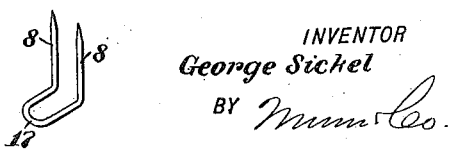

UNITED STATES PATENT OFFICE.

GEORGE SICKEL, OF ST. JOSEPH, MISSOURI.

COTTON-PICKER.

944,156.

Specification of Letters Patent. Patented Dec. 21, 1909.

Application filed June 3, 1909. Serial No. 499,853.

*To all whom it may concern:*

Be it known that I, GEORGE SICKEL, a citizen of the United States, and a resident of St. Joseph, in the county of Buchanan and State of Missouri, have invented a certain new and useful Cotton-Picker, of which the following is a full, clear, and exact description.

This invention has for its principal objects: to provide a mechanical contrivance wherewith cotton may be picked; to provide a device for mechanically controlling the cotton as picked; and to provide a mechanism of the character described, which will perform its functions without damage to the growing plants and to lessen the labor incident to picking the cotton by hand.

One embodiment of the present invention is disclosed in the structure illustrated in the accompanying drawings, wherein like characters of reference indicate corresponding parts in all the views.

Figure 1 is a side elevation of a mechanism constructed in accordance with my invention; Fig. 2 is a plan view of the same; Fig. 3 is an enlarged detail, showing the manner of mounting the picker hooks on the belts; Fig. 4 is a detail view in perspective, of the picker hooks employed; Fig. 5 is a side elevation of the picker nozzle; Fig. 6 is a longitudinal vertical section of the picker nozzle; and Fig. 7 is a longitudinal horizontal section of the picker nozzle taken on the line 7—7 in Fig. 6, the inner ply or thickness of the belt being removed to show the holding sections of the staples.

The agencies employed in performing the function of the present construction are both mechanical and pneumatic. The cotton is separated from the pod by picker pins 8, 8 on two belts 9, 9, mounted upon suitable sprocket chains 10, 10, which are driven by sprocket wheels 11, 11 mounted on the shafts 12, 13 and 14, 14. At either side of the sprocket wheels drums 15, 15 support the belts 9, 9. The shafts 12, 13 and 14, 14 are suitably mounted in the sides 16, 16 of a box-like frame or nozzle formed substantially as shown in Figs. 5 to 7, inclusive. The pins 8, 8 are held by the belts 9 rigidly in the upright position shown in Fig. 3 of the drawings, being secured thereto by fastenings secured to the loop ends 17, of the double ended pins 8, 8, as shown in Fig. 4 of the drawings. The pins pass each other when drawn around the forward drums 15, 15, which are mounted upon the shaft 14, 14. The direction of the movement of the belts 9, 9 is indicated by arrows in Fig. 6 of the drawings. The belts approach each other nearest where they pass around the drums 15, 15 on the shafts 14, 14, when the teeth are passing inward or toward the rear of the picker nozzle. From this point the two belts diverge and the teeth 8, 8 are separated.

The shaft 13 is driven by a short shaft 18, which is mounted upon the outer side of the picker nozzle in bearings 19, 19. Fixedly mounted on the shaft 18 is a bevel gear 20, maintained in toothed engagement with a bevel wheel 21, which is fixedly mounted upon the shaft 13. The shaft 13 is provided also with a straight toothed gear 22, likewise fixedly mounted upon the said shaft, and which is maintained in toothed engagement with a straight gear 23, mounted upon the shaft 12.

Suitably connected to the shaft 18 is a flexible driving shaft 24. The driving shaft 24 is a connecting member between the shaft 18 and one of the knuckle joints 25 with which a rod 26 is provided. The other knuckle joint is provided for connecting the rod 26 with a counter shaft 27, mounted on the frame of a portable platform 28. The shaft 27 may be driven manually or by any suitable motive power. That illustrated in the drawings is an internal combustion engine 29, likewise mounted upon the platform 28, and connected through a belt 30 with a driving pulley 31 mounted upon the shaft 27. The shaft 27 is mounted in suitable bearings 32, 32, which in the present instance are shown as being bolted in position upon a compression tank 33.

When the engine 29 is driven, it operates through the belt 30 to rotate the shaft 27, the rotary motion of which is transmitted through the rod 26 to the flexible connection 24, to rotate the shaft 18, and through the gears 20, 21, 22 and 23, rotating the shafts 12 and 13 to operate the belts 9 in the directions indicated by the arrows in Fig. 6.

With a nozzle of the character indicated, having belts with the pins 8, 8 operating in the manner described, the cotton is picked. This is accomplished by presenting to the pod the mouth of the nozzle until the pins 8, 8 comb the cotton away from the pod and carry it within the mouth of the nozzle in the direction of the travel of the belts 9, 9. The mechanism for thus separating the cotton from the pod is delicate in operation, so that neither the pod nor the plant are injured by the tool. When the teeth 8, 8 separate, as they do within the nozzle, the cotton is carried to the rear end of the nozzle. A large proportion of the cotton would be carried around the drums upon which the belts are mounted, if not otherwise influenced. In the present invention it is to prevent the cotton from being thus carried by the belts and also to deliver the cotton into a receptacle suitable for holding the same, that I introduce air under pressure at this point.

The air utilized by me is contained within the tank 33, which is mounted upon the platform 28. Air is led therefrom by a suitable hose 34, 34, which is connected to a double branch tube 35. These branches are inserted through suitable openings in the sides 16 of the nozzle, and extended between the belts in the position practically as shown in Fig. 6 of the drawings. After entering the sides 16, 16 the inserted ends of the tubes 35, 35 are inclined backward in the line of travel of the proximate sides of the belts 9, 9 and toward the hose connection 36, as shown by the arrows in Figs. 6 and 7. The hose 36 is connected to a tube 37, inserted within a suitable receptacle 38, which, in the present instance, is a box or crate having a gauze covering the top. When a valve 39 is turned so as to permit the air to enter the nozzle through the pipe 34 and tubes 35, there is produced a heavy rush of air backward from the nozzle through the pipes 36 and 37 and into the receptacle 38. This rush of air lifts the cotton from the pins 8, 8 and carries it backward through the pipes and into the said receptacle. The air pressure is produced in the tank 33 by means of a suitable air pump 39$^a$, which is driven by the motor 29 through a belt 40 and a driven pulley 41. The air from the pump 39$^a$ is delivered into the tank 33 through a pipe 42; any suitable pump for producing this air pressure may be used.

The various fixed instrumentalities hereinbefore described are mounted upon the platform 28, and the latter is suitably mounted upon three wheels, the rear wheels 43, 43 being set apart the width of two rows of cotton plants, while a single front wheel 44 is mounted at the front end of the platform 28 in a pivotal bearing or king pin 45. The wheel 44 is located so that it will track in the intermediate space between the two rows of plants which the said wheels 43, 43 are so disposed as to straddle. The vehicle is guided by a shaft 46. The traction power for this vehicle may be either man, horse or motor.

The operation of picking cotton with an implement thus constructed and arranged is as follows: The vehicle is propelled over the field, the wheels 43, 43 and 44 tracking as described in the spaces at either side of and between two rows of cotton plants. The operator walks beside the vehicle, presenting the picker nozzle to each pod, so that the pins 8, 8 engage the cotton to separate it from the pod. The cotton as separated from the pod and carried into the picker nozzle, is by the compressed air carried through the pipe 36 and tube 37 into the receptacle 38. When the receptacle 38 becomes filled with the cotton, it is raised from the vehicle and emptied, depositing the cotton as picked in suitable sacks. In some instances I provide means for attaching the sack directly to the tube 37, so that when removed from the said tube the cotton need not be disturbed but is suitably packed within the sack. This facilitates the operation, as by it the filled sack may be laid to one side, while an empty sack may be quickly placed in position and the vehicle moved on.

While I have herein described and shown a single picker nozzle located to be operated from one side of the vehicle, I wish it to be understood that the nozzle and operating attachments may be duplicated so that the same can be operated from each side of the vehicle simultaneously.

Having thus described my invention, I claim as new and desire to secure by Letters Patent:

1. A cotton picker comprising a nozzle; a flexible conveyer pipe attached to said nozzle; a receptacle for the cotton adapted to receive the same from said conveyer; a plurality of rollers, two of which are closely and oppositely disposed at the inlet passage of said nozzle, and two of which are separated within said nozzle and to the rear of said inlet; a plurality of belts mounted upon said rollers; finger-like extensions mounted upon the outer surface of said belts, said extensions on each belt adapted to extend into the path of the extensions on the opposite belt; a driving mechanism to rotate said rollers; and a pneumatic propelling system to remove the cotton from said extensions and move the same along the said conveyer pipe to said receptacle.

2. A cotton picker comprising a nozzle; a flexible conveyer pipe attached to said nozzle; a receptacle for the cotton adapted to receive the same from said conveyer; a plurality of rollers, two of which are closely and oppositely disposed at the inlet passage of said nozzle, and two of which are separated within said nozzle and to the rear of said inlet; a plurality of belts mounted upon said rollers; finger-like extensions mounted upon said belts and extended from the surface thereof and adapted to intermesh when passing between said rollers at the inlet of said nozzle; a driving mechanism to rotate said rollers; and a pneumatic propelling system to remove the cotton from said extensions and move the same along the said pipe to said receptacle.

3. A cotton picker comprising a nozzle; a flexible conveyer pipe attached to said nozzle; a receptacle for the cotton adapted to receive the same from said conveyer; a plurality of rollers, two of which are closely and oppositely disposed at the inlet passage of said nozzle, and two of which are separated within said nozzle to the rear of said inlet; a plurality of endless belts mounted on said rollers; a plurality of finger-like extensions mounted upon the said belts and extended from the surface thereof, said extensions on each belt adapted to intermesh with the extensions on the other belt when passing between the rollers at the inlet passage; a driving mechanism to rotate said rollers embodying a suitable portable engine and transmission mechanism incorporating a flexible driving shaft and engaged miter gears mounted on said nozzle, one of which is fixedly attached to one of said rollers; and a pneumatic propelling system to remove the cotton from said extensions and move the same along the said pipe to said receptacle.

4. A cotton picker comprising a nozzle; a flexible conveyer pipe attached to said nozzle; a receptacle for the cotton adapted to receive the same from said conveyer; a plurality of rollers mounted in said nozzle, two of which are closely and oppositely disposed at the inlet passage of said nozzle, and two of which are separated within said nozzle to the rear of said inlet; a plurality of endless belts mounted upon said rollers; a plurality of finger-like extensions mounted upon said belts and extended from the surface thereof, said extensions adapted to intermesh when passing between the rollers at the inlet of said nozzle; a driving mechanism to rotate said rollers; a compressed air engine; and delivery tubes for compressed air connected with said engine, extended within said nozzle between said belts and opening toward the delivery end thereof.

In testimony whereof I have signed my name to this specification in the presence of two subscribing witnesses.

GEORGE SICKEL.

Witnesses:
    John B. Carrington,
    P. A. Loris.